US011990291B2

(12) United States Patent
Lee et al.

(10) Patent No.: US 11,990,291 B2
(45) Date of Patent: May 21, 2024

(54) HYBRID POWER BUTTON WITH MULTIPLE FUNCTIONS

(71) Applicant: Dell Products L.P., Round Rock, TX (US)

(72) Inventors: Jer-Yo Lee, Taipei (TW); Chun-Ting Lu, New Taipei (TW); Cheng-Hsiang Chuang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 17/825,242

(22) Filed: May 26, 2022

(65) Prior Publication Data

US 2023/0386764 A1 Nov. 30, 2023

(51) Int. Cl.
*H01H 13/14* (2006.01)
*H01H 13/04* (2006.01)

(52) U.S. Cl.
CPC ............ *H01H 13/14* (2013.01); *H01H 13/04* (2013.01)

(58) Field of Classification Search
CPC .......... H01H 13/14; H01H 13/04; H01H 3/08; H01H 3/12; H01H 13/10; H01H 13/50; H01H 19/03; H01H 19/08; H01H 19/14; H01H 19/36; H01H 2019/008
See application file for complete search history.

(56) References Cited

U.S. PATENT DOCUMENTS

| | | | | |
|---|---|---|---|---|
| 6,392,637 | B2 | 5/2002 | Liao et al. | |
| 7,235,754 | B2 * | 6/2007 | Rochon .................. | H01H 13/48 200/406 |
| 9,389,711 | B2 | 7/2016 | Casparian et al. | |
| 10,229,797 | B2 * | 3/2019 | Yoshida ................. | H01H 13/10 |
| 2015/0316990 | A1 | 11/2015 | Pacheco et al. | |

* cited by examiner

*Primary Examiner* — Lheiren Mae A Caroc
(74) *Attorney, Agent, or Firm* — Larson Newman, LLP

(57) ABSTRACT

A multiple function button for an information handling system includes an outer shell and an inner button. The outer shell includes multiple channels having first, second, third and fourth channels. The inner button is inserted within the outer shell. The inner button includes a tab and a contact component. The tab moves within the multiple channels. When the tab is within the first channel, the inner button is in a first position and contact component is positioned over a first contact of the information handling system. When the tab is within the third channel, the inner button is in a second position and the contact component is positioned over a second contact of the information handling system.

18 Claims, 9 Drawing Sheets

HYBRID POWER BUTTON WITH MULTIPLE FUNCTIONS

FIELD OF THE DISCLOSURE

The present disclosure generally relates to information handling systems, and more particularly relates to a hybrid power button with multiple functions.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A multiple function button for an information handling system includes an outer shell and an inner button. The outer shell includes multiple channels having first, second, third and fourth channels. The inner button is inserted within the outer shell. The inner button includes a tab and a contact component. The tab may move within the multiple channels. When the tab is within the first channel, the inner button is in a first position and contact component is positioned over a first contact of the information handling system. When the tab is within the third channel, the inner button is in a second position and the contact component is positioned over a second contact of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
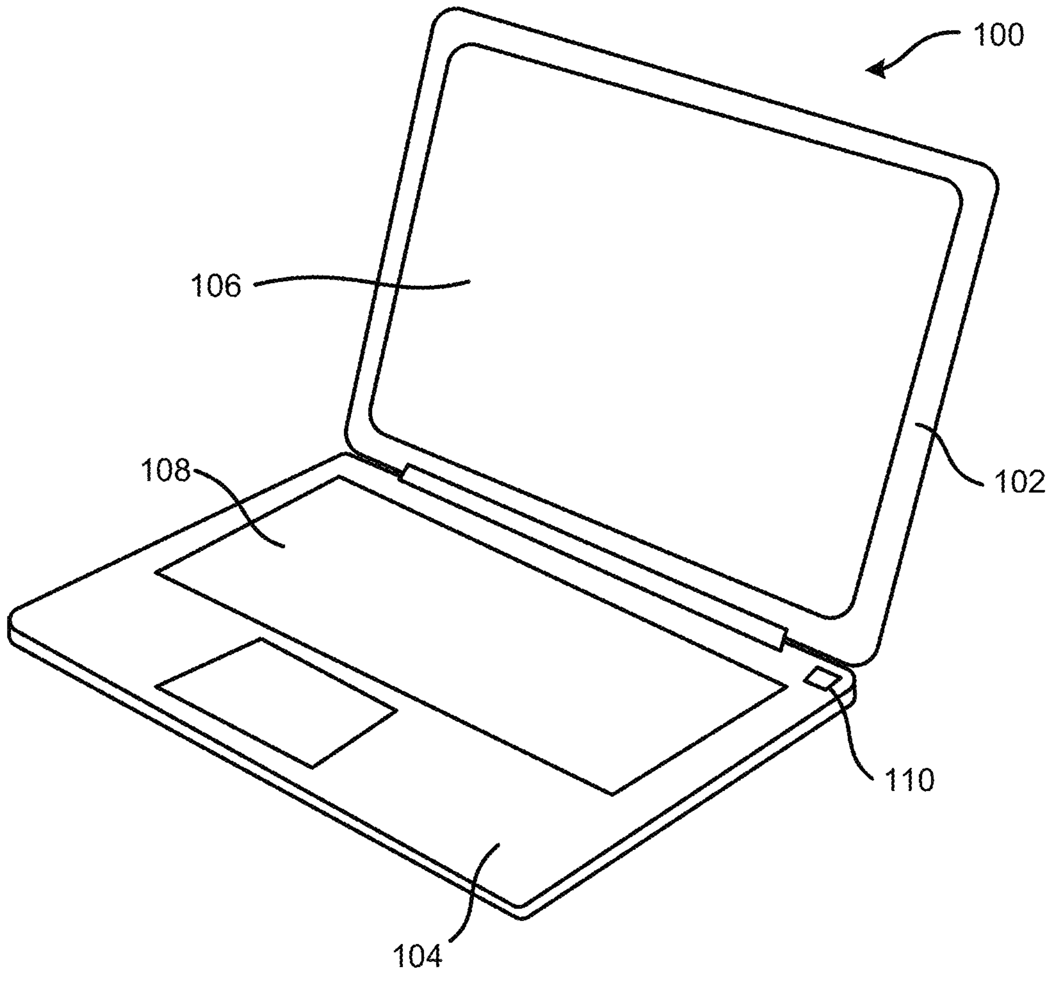
FIG. 1 is a diagram of an information handling system according to at least one embodiment of the present disclosure.

FIG. 1 shows an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a cover 102 and a base 104. Cover 102 includes a display 106, and base 104 includes a keyboard 108 and a multiple function button 110. While in a first mode, configuration, position, or the like, multiple function button 110 may be utilized as a power button for information handling system 100. In this situation, the actuating or pressing down of multiple function button 110 may cause information handling system 100 to power down or to power up, depending on the current power state of the information handling system. While in a second mode, configuration, position, or the like, multiple function button 110 may be utilized to cause information handling system 100 to perform another operation or function. In this situation, the actuating or pressing down of multiple function button 110 may cause information handling system 100 to perform any suitable operations other than power off/up including, but not limited to, clear a complementary metal-oxide-semiconductor (CMOS) of the information handling system, place the information handling system in a deep sleep mode, provide a gaming application operation, and provide any other human computer interaction (HCI) operation.

From generation to generation of information handling systems, more and more functions have been integrated into consumer electronics. However, during the changes from generation to generation of information handling systems, an amount of HCI devices were limited due to the size of the information handling system. In this situation, the lack of HCI devices has caused user-unfriendliness of certain functions within the previous information handling systems. For example, in previous information handling systems, users may need to clear the CMOS while experiencing hardware compatibility issues, but the user would have to teardown the information handling system, hold the power button for 25-30 seconds, or the like.

Information handling system 100 may be improved by multiple function button 110. For example, multiple function button 110 may include one or more structural features to support additional features over previous power buttons. For example, multiple function button 110 may include a rotating mechanism, an inner button, or the like to provide another dimension to support additional features. When the user presses the inner button or turns and presses the power button, the secondary operation may be triggered. For the rotating case, multiple function button 110 may then automatically rotate back to an initial position.

Figure 2:
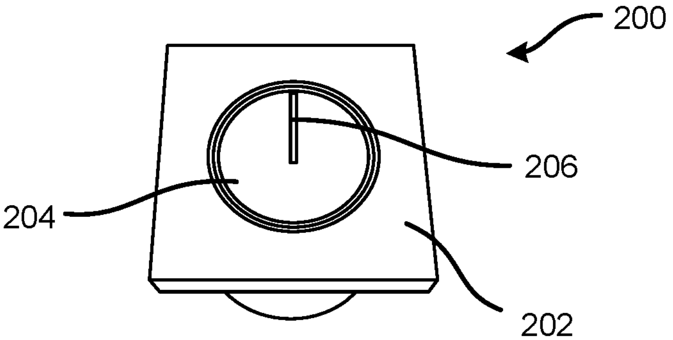
FIG. 2 is a diagram of a hybrid button device for the information handling system according to at least one embodiment of the present disclosure.

FIG. 2 illustrates a hybrid button device 200 for an information handling system, such as information handling system 100 of FIG. 1, according to at least one embodiment of the present disclosure. Hybrid button device 200 may be substantially similar to multiple function button 110. Hybrid button device 200 includes an outer shell portion 202 and an inner button 204. In an example, hybrid button device 200 may be a rotating button, such that when inner button 204 is pressed while in a first position, a first operation is performed. In this example, when the inner button is pressed while in a second portion, a second operation is performed. Inner button 204 includes a notch 206 to enable a user to rotate the inner button between the first and second position. While notch 206 is described herein, inner button 204 may include any suitable component or item to enable the inner button to be rotated, such as a knob, a hole, or the like. Operation of hybrid button device 200 will be described with respect to FIGS. 3-5 below.

Figure 3:
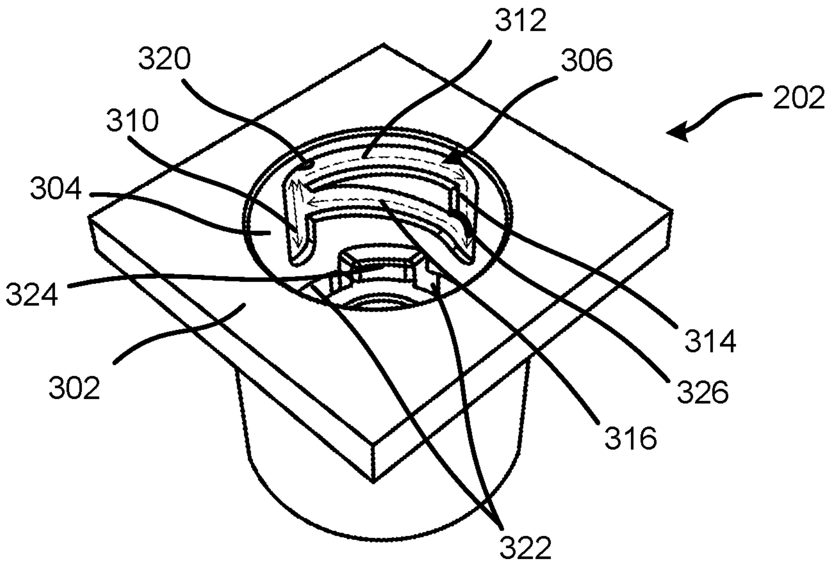
FIG. 3 is a diagram of an outer portion of the hybrid button device for the information handling system according to at least one embodiment of the present disclosure.

FIG. 3 illustrates outer shell portion 202 of a hybrid button device, such as hybrid button device 200 of FIG. 2, according to at least one embodiment of the present disclosure. Outer shell portion 202 includes a top surface 302 and an inner surface 304. Inner surface 304 includes a multiple direction channel 306. Multiple direction channel 306 includes channels 310, 312, 314, and 316 (310-316). At an intersection or interface between channels 310 and 312, multiple direction channel 306 includes a bump 320 on a top edge of the channel. Inner surface 304 includes notches 322 and a stopper 324, which may be placed in physical communication with portions of inner button 204 of FIG. 2 as will be described herein. A lip 326 is located at an intersection or interface between channels 314 and 316. In an example, channels 310-316 may be utilized to enable inner button 204 of FIG. 2 to rotate between the first and second positions, and to be pressed down within outer shell 202 to engage different functions or operations within an information handling system, such as information handling system 100 of FIG. 1 as will be described herein.

Figure 4:
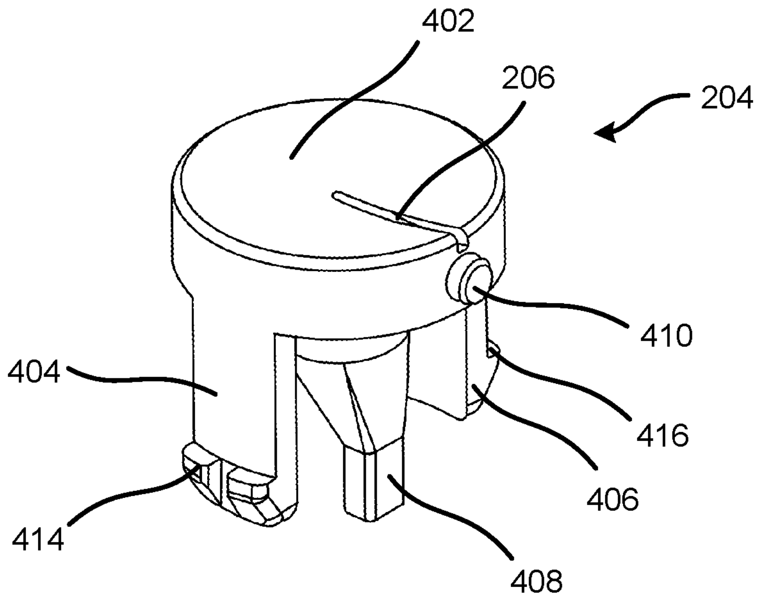
FIG. 4 is a diagram of an inner portion of the hybrid button device for the information handling system according to at least one embodiment of the present disclosure.

FIG. 4 illustrates inner button 204 of a hybrid button device, such as hybrid button device 200 of FIG. 2, according to at least one embodiment of the present disclosure. Inner button 204 includes a top surface 402, retention components 404 and 406, a contact portion 408, and a tab 410. Retention component 404 includes a snap fit portion 414, and retention component 406 includes a snap fit portion 416. In an example, contact portion 408 may be placed in physical contact with different contacts of an information handling system, such as information handling system 100 of FIG. 1, based on the position of inner button 204 as will be described herein.

Figure 5:
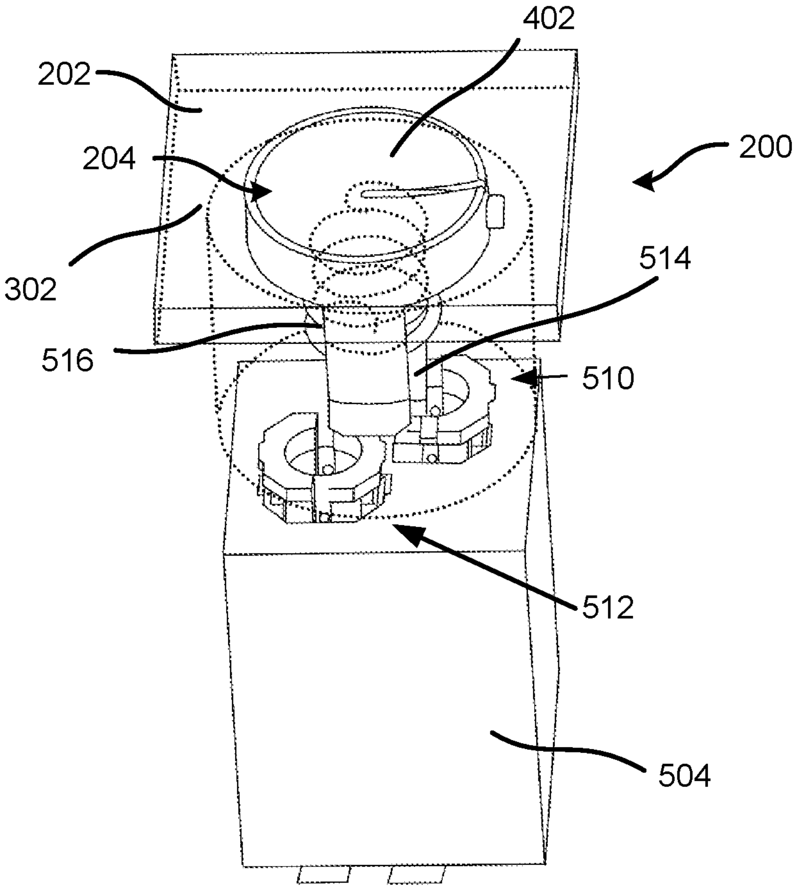
FIG. 5 is a diagram of the hybrid button device having an interface with a component of the information handling system according to at least one embodiment of the present disclosure.

FIG. 5 illustrates hybrid button device 200 and a component 504 an information handling system, such as information handling system 100 of FIG. 1, according to at least one embodiment of the present disclosure. Component 504 includes contacts 510 and 512. Inner button 204 includes a spring 516. In an example, spring 516 may bias inner button 204 such that top surface 402 of the inner button is substantially flush with top surface 302 of outer shell 202.

Referring now to FIGS. 3-5, inner button 204 may snap fit within outer shell 202 in any suitable manner. For example, snap fit portion 414 of retention component 404 may snap fit within one of notches 322, and snap fit portion 416 of retention component 406 may snap fit within the other one of notches 322. Once snap fit portions 414 and 416 are within notches 322, a top side of each of the snap fit portions may be in physical communication with a respective surface of the notches so that top surface 402 of inner button 204 does not extend beyond top surface 302 of outer shell 202. For example, spring 516 may exert a force on inner button 204 to push top surface 402 of inner button 204 does not extend beyond top surface 302 of outer shell 202, but the physical communication between a top side of each of snap fit portions 414 and 416 with a respective surface of notches 322 holds the inner button within the outer shell.

In an example, a different one of retention components 404 and 406 may be placed in physical communication with a different side of stopper 324. For example, when inner button 204 is in the first position, a side of retention component 404 may be in physical communication with a first side of stopper 324. When inner button 204 is in the second position, a side of retention component 406 may be in physical communication with a second side of stopper 324. In this example, stopper 324 may control an amount of rotation for inner button 204 between the first and second positions. In certain examples, stopper 324 physical communication with retention components 404 and 406 may substantially correspond with the movement of tab 410 within multiple channel 306. For example, when tab 410 is located within channel 310, a side of retention component 404 may be in physical communication with a first side of stopper 324. When tab 410 is located within channel 314, a side of retention component 406 may be in physical communication with a second side of stopper 324.

In certain examples, channel 310 may be located within inner surface 304 such that tab 410 of inner button 204 may slide up and down within channel 310 while the inner button is in the first position. In an example, while inner button 204 is in the first position, contact portion 408 may be positioned substantially of contact 510. In response to inner button 204 being pressed down in the first position, tab 410 may slide down channel 310 and contact portion 408 may exert a force on contact 510. In an example, the force from contact portion 408 exerted on contact 510 may cause information handling system 100 to perform a first operation, such as power on or off as will be explained with respect to FIG. 6.

Figure 6:
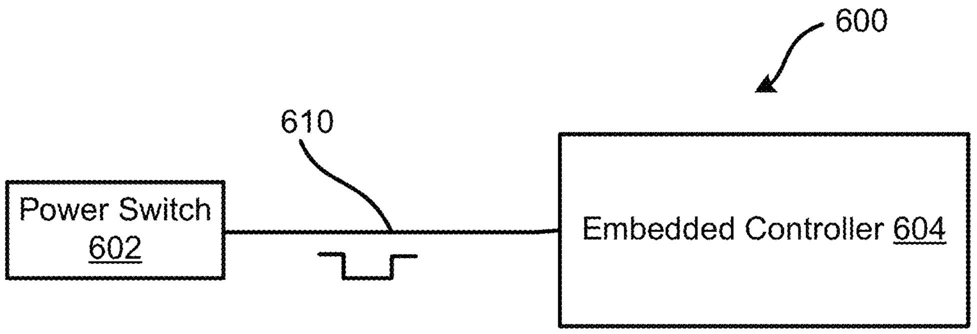
FIG. 6 is a block diagram of the hybrid button device and an embedded controller according to at least one embodiment of the present disclosure.

FIG. 6 illustrates a portion of an information handling system 600 including a power switch 602 and an embedded controller 604 according to at least one embodiment of the present disclosure. Information handling system 600 may be substantially similar to information handling system 100 of FIG. 1. Power switch 602 may communication with embedded controller 604 via a communication line 610. In an example, power switch 602 may be substantially similar to hybrid button device 200 when the hybrid button device is in the first position. In certain examples, information handling system 600 may include additional components without varying from the scope of this disclosure.

In an example, in response to power switch 602 being closed, a pulse may be provided along communication line 610 to embedded controller 604. Power switch 602 may be closed in any suitable manner including, but not limited to, inner button 204 of FIG. 2 being pressed down within the hybrid button device 200 while the inner button is in the first position. In response to receiving the pulse along communication line 610, embedded controller 604 may transition a power state of information handling system 600, such as from a powered off state to a powered on state, or from the powered on state to the powered off state.

Referring back to FIGS. 2-5, after the force pushing inner button 204 down is removed, spring 516 may exert a force to push tab 410 up channel 310 until the physical communication between a top side of each of snap fit portions 414 and 416 with a respective surface of notches 322 holds the inner button within the outer shell. In an example, if a user of information handling system 100 wants to utilize hybrid button 200 for a secondary function, the user may transition or rotate inner button 204 such that tab 312 travels along channel 312 until the tab reaches channel 314 and a side of retention component 406 is in physical communication with stopper 324. In certain examples, the user may rotate inner button 204 by exerting a rotational force within slot 206 of the inner button. Additionally, before inner button 204 may rotate from the first position to the second position, a small force should be exerted down on the inner button while the rotational force is also being exerted. In this example, the small force exerted down on inner button 204 may enable tab 410 to slip below bump 320 and enter channel 312. In response to tab 410 passing bump 320, the small downward force may be removed and spring 516 may exert a force on inner button 204 to place the tab in physical communication with a top edge of channel 312.

In response to tab 312 being located within channel 314 and a side of retention component 406 being in physical communication with stopper 324, inner button 204 is in the second position. In certain examples, channel 314 may be located within inner surface 304 such that tab 410 of inner button 204 may slide down within channel 314 while the inner button is in the second position. In an example, while inner button 204 is in the second position, contact portion 408 may be positioned substantially of contact 512. In response to inner button 204 being pressed down in the second position, tab 410 may slide down channel 314 and slip over lip 326, and contact portion 408 may exert a force on contact 512. In an example, the force from contact portion 408 exerted on contact 512 may cause information handling system 100 to perform a second operation, such as clearing a CMOS of the information handling system as will be explained with respect to FIG. 7.

Figure 7:
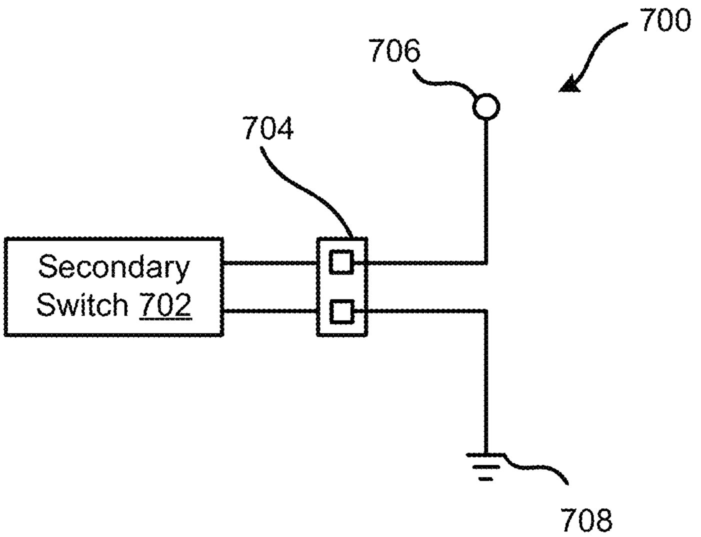
FIG. 7 is a block diagram of the hybrid button device and a secondary operation component according to at least one embodiment of the present disclosure.

FIG. 7 illustrates a portion of an information handling system 700 including a secondary switch 702, a CMOS device 704, a first voltage reference 706, and a second voltage reference 708 according to at least one embodiment of the present disclosure. Information handling system 700 may be substantially similar to information handling system 100 of FIG. 1. Secondary switch 702 may communication with CMOS device 704 via multiple communication lines. In an example, secondary switch 702 may be substantially similar to hybrid button device 200 when the hybrid button device is in the second position. In certain examples, information handling system 700 may include additional components without varying from the scope of this disclosure.

In an example, in response to secondary switch 702 being closed, the secondary switch may enable a current to flow from the first voltage reference 706 through CMOS device 704 to the second voltage reference 708. Secondary switch 702 may be closed in any suitable manner including, but not limited to, inner button 204 of FIG. 2 being pressed down within the hybrid button device 200 while the inner button is in the second position. In response to the current flowing from first voltage reference 706 through CMOS device 704 to second voltage reference 708, the CMOS device may be clear. One of ordinary skill would recognize that clearly CMOS device 704 is only one of multiple operations that may be performed in response to second switch 702 being closed.

Referring back to FIGS. 2-5, after the force pushing inner button 204 down is removed, spring 516 may exert a force to push tab 410 up channel 314. In response to tab 410 coming in contact with lip 326, inner button 204 may rotate as the tab slides along the lip until the tab enters channel 316. The force from spring 516 may continue to push tab 410 along channel 316 until the tab is within channel 310. In response to tab 410 being in channel 310 spring 516 may exert a force to push tab 410 up channel 310 until the physical communication between a top side of each of snap fit portions 414 and 416 with a respective surface of notches 322 holds the inner button within the outer shell. In this situation, inner button 204 may be located back at the first position.

Figure 8:
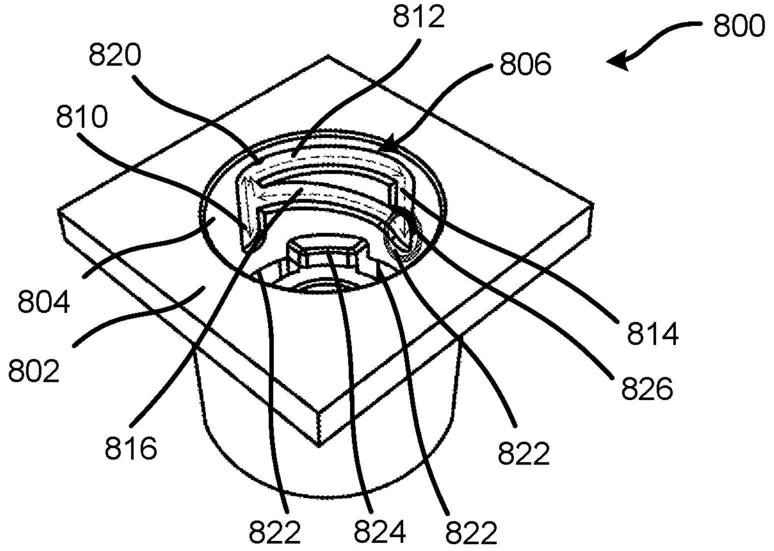
FIG. 8 is a diagram of an outer portion of another embodiment of a hybrid button device for the information handling system according to at least one embodiment of the present disclosure.

FIG. 8 illustrates an embodiment of an outer shell portion 800 of a hybrid button device, such as hybrid button device 200 of FIG. 2, according to at least one embodiment of the present disclosure. Outer shell portion 800 includes a top surface 802 and an inner surface 804. Inner surface 804 includes a multiple direction channel 806. Multiple direction channel 806 includes channels 810, 812, 814, and 816 (810-816). At an intersection or interface between channels 810 and 812, multiple direction channel 806 includes a bump 820 on a top edge of the channel. Inner surface 804 includes notches 822 and a stopper 824, which may be placed in physical communication with portions of inner button 204 of FIG. 2. A lip 826 is located at an intersection or interface between channels 814 and 816. In an example, channels 810-816 may be utilized in substantially the same manner as channels 310-316 of FIG. 3 to enable inner button 204 of FIG. 2 to rotate between the first and second positions, and to be pressed down within outer shell 800 to engage different functions or operations within an information handling system, such as information handling system 100 of FIG. 1.

Figure 9:
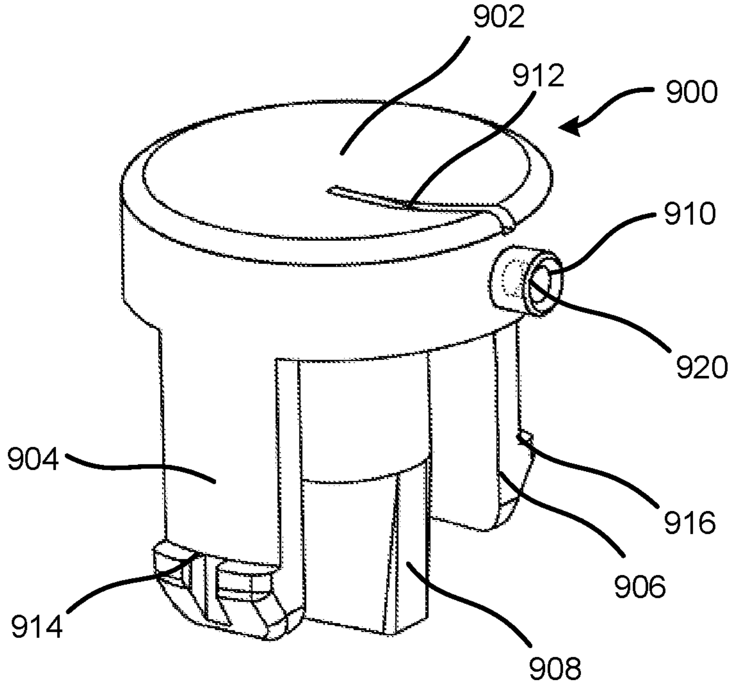
FIG. 9 is a diagram of an inner portion of the other embodiment of the hybrid button device for the information handling system according to at least one embodiment of the present disclosure.

FIG. 9 illustrates inner button 900 of a hybrid button device, such as hybrid button device 200 of FIG. 2, according to at least one embodiment of the present disclosure. Inner button 900 includes a top surface 902, retention components 904 and 906, a contact portion 908, a tab 910, and a slot 912. Retention component 904 includes a snap fit portion 914, and retention component 906 includes a snap fit portion 916. Tab 910 includes a ferromagnetic material 920. In an example, contact portion 908 may be placed in physical contact with different contacts of an information handling system, such as information handling system 100 of FIG. 1, based on the position of inner button 900.

Figure 10:
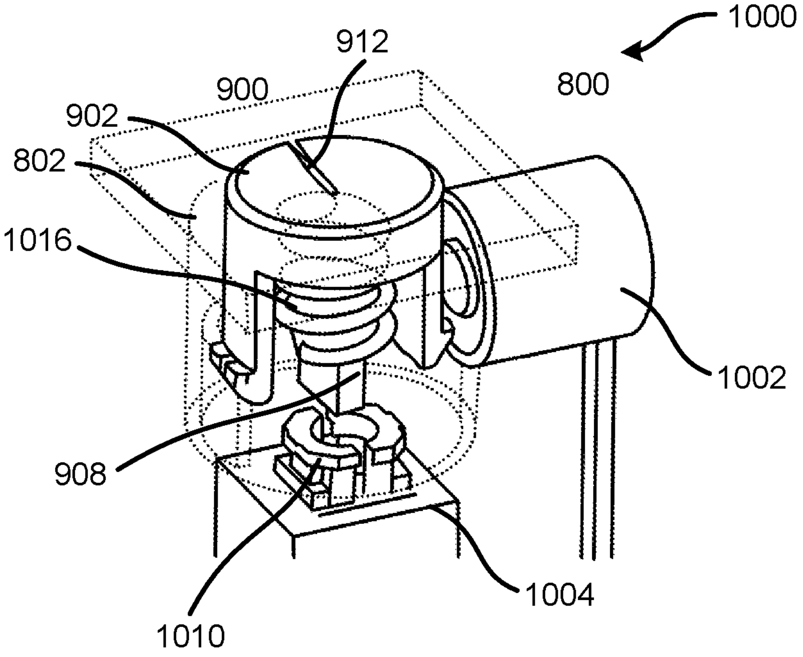
FIG. 10 is a diagram of the other embodiment of the hybrid button device having an interface with a component of the information handling system according to at least one embodiment of the present disclosure.

FIG. 10 illustrates a hybrid button device 1000, an electromagnet 1002, and a component 1002 an information handling system, such as information handling system 100 of FIG. 1, according to at least one embodiment of the present disclosure. Component 1002 includes a contact 1010. Inner button 900 includes a spring 1016. In an example, spring 1016 may bias inner button 900 such that top surface 902 of the inner button is substantially flush with top surface 802 of outer shell 800.

In an example, hybrid button device 1000 may operate in substantially the same manner of hybrid button device 200 as described above with respect to FIGS. 3-5. For clarity and brevity, the rotation of inner button 900 between the first and second positions will not be described again, but may be performed via tab 910 and channels 810-816 as described above with respect to tab 410 and channels 310-316. In an example, electromagnet 1002 is utilized to hold contact portion 908 in physical communication with contact 1010 for a predetermined amount of time. For example, when tab 910 slides down channel 814, electromagnet 1002 may activate and hold the tab at point 822 within the bottom of channel 814. In this example, electromagnet 1002 may attract ferromagnetic material 920 of tab 910 to hold the tab at point 822. While tab 910 is held at point 822, contact component 908 may continuously exert a force on contact 1010 to cause an information handling system to perform a secondary operation as will be described with respect to FIG. 11.

Figure 11:
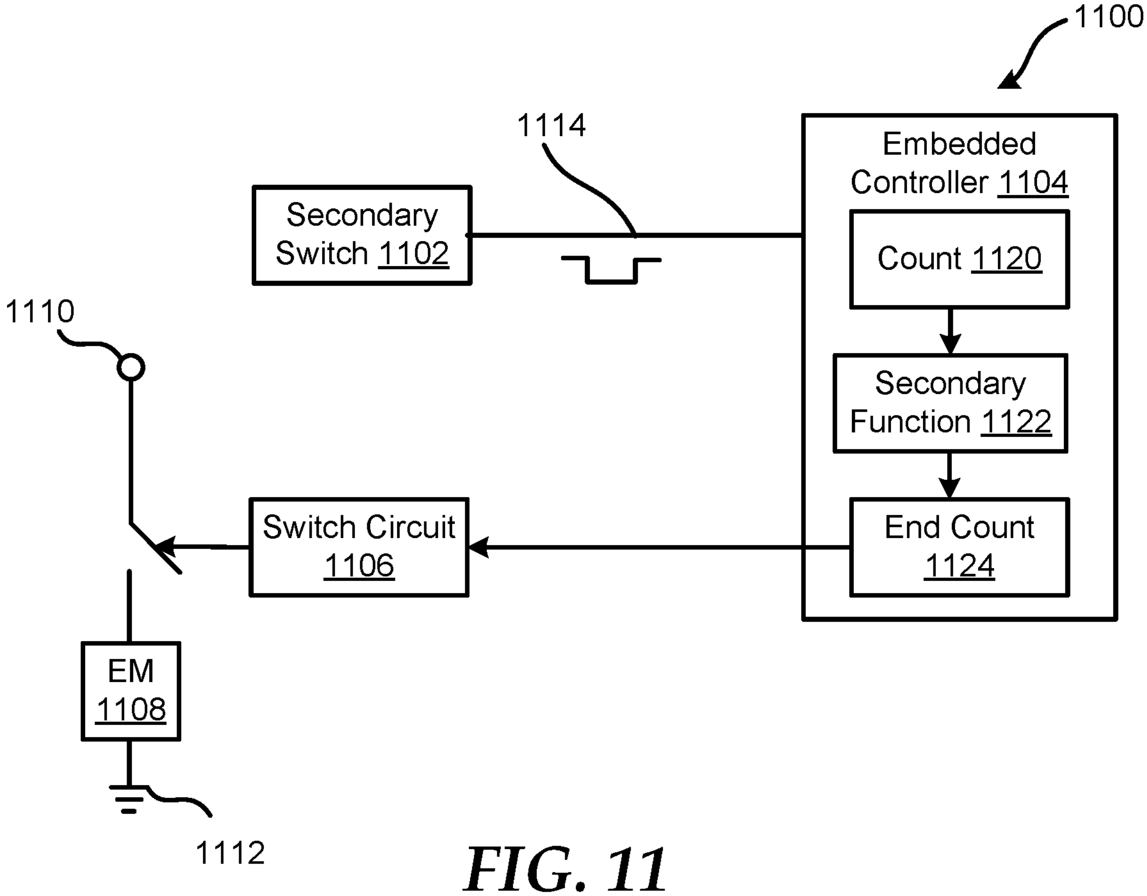
FIG. 11 is a block diagram of the other embodiment of the hybrid button device and an embedded controller according to at least one embodiment of the present disclosure.

FIG. 11 illustrates a portion of an information handling system 1100 including a secondary switch 1102, an embedded controller 1104, a switch circuit 1106, an electromagnet 1108, a first voltage reference 1110, and a second voltage reference 1112 according to at least one embodiment of the present disclosure. Information handling system 1100 may be substantially similar to information handling system 100 of FIG. 1. Secondary switch 1102 may communication with embedded controller 1104 via communication line 1114. In an example, secondary switch 1102 may be substantially similar to hybrid button device 1000 when the hybrid button device is in the second position. In certain examples, information handling system 1100 may include additional components without varying from the scope of this disclosure.

In an example, in response to secondary switch 1102 being closed, a pulse is provided along communication line 1114 to embedded controller 1104. Based on the pulse, embedded controller 1104 may activate switch circuit 1106, which in turn may close to enable a current to flow from the first voltage reference 1110 through electromagnet 1108 to the second voltage reference 1112. Secondary switch 1102 may be closed in any suitable manner including, but not limited to, inner button 900 of FIG. 9 being pressed down within the hybrid button device 1000 while the inner button is in the second position. In response to the current flowing from first voltage reference 1110 through electromagnet 1108 to second voltage reference 1112, the electromagnet may hold tab 910 in location 822 as described above.

Additionally, in response to the pulse, embedded controller 1104 may set a count at block 1120. In an example, the count may be any suitable length of time, such as 25 seconds, 30 seconds, or the like. At block 1122, embedded controller may enable a secondary function. In an example, the secondary function or operation may be performed as long as the switch circuit 1106 is closed, which in turn causes electromagnet 1108 to hold tab 910 in location 822. At block 1124, embedded controller 1104 may determine when the count has ended. In response to the count ending, embedded controller 1104 may cause switch circuit 1106 to open. Based on switch circuit 1106 being open, the current no longer flows from first voltage reference 1110 through electromagnet 1108 to second voltage reference 1112. Based on the lack of current flow, electromagnet 1108 may no longer hold tab 910 at location 822, such that inner button 900 may rotate along lip 826 and channel 816 to channel 810 as described above with respect to tab 410, channels 314 and 316, and lip 326.

Figure 12:
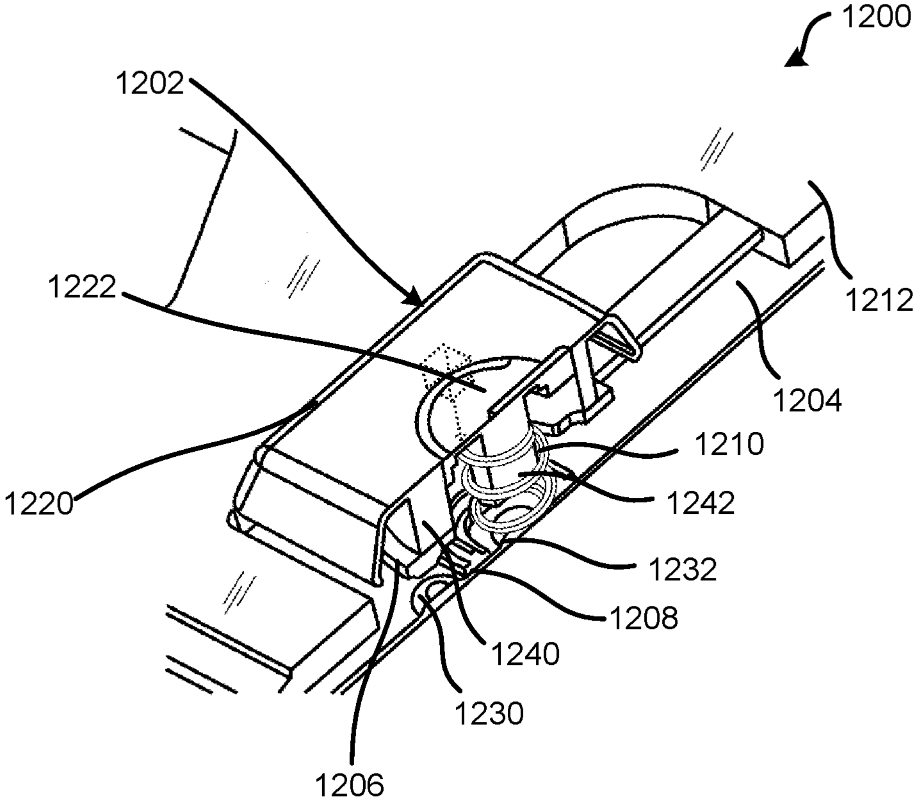
FIG. 12 is a diagram of a cross section of another embodiment of the hybrid button device according to at least one embodiment of the present disclosure.
Figure 13:
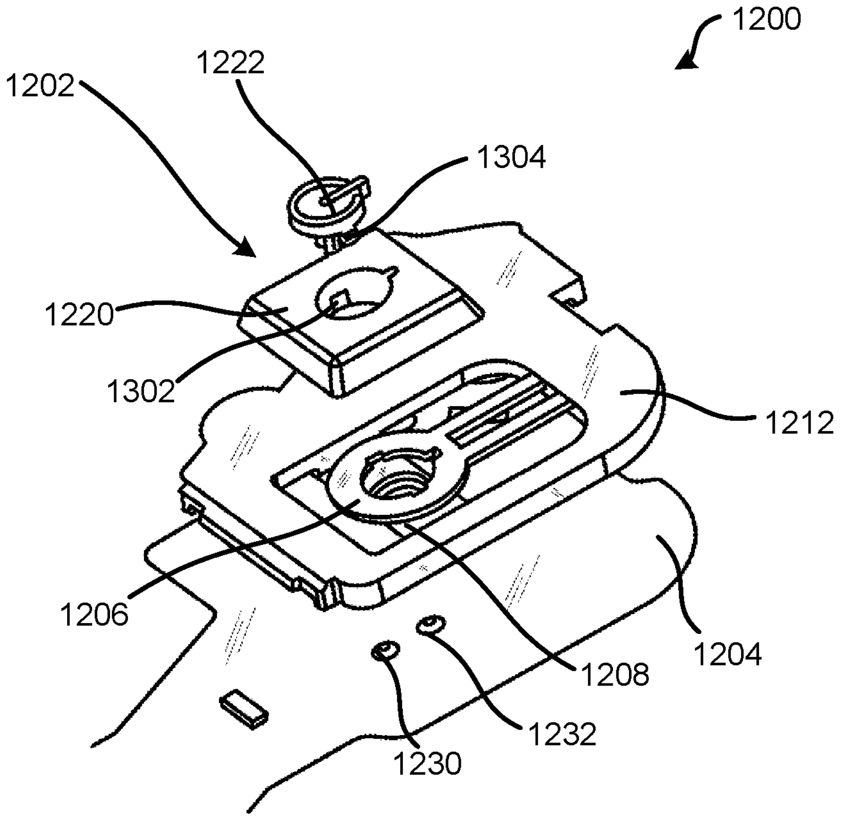
FIG. 13 is a diagram of an exploded view of the hybrid button device of FIG. 12 according to at least one embodiment of the present disclosure.
Figure 14:
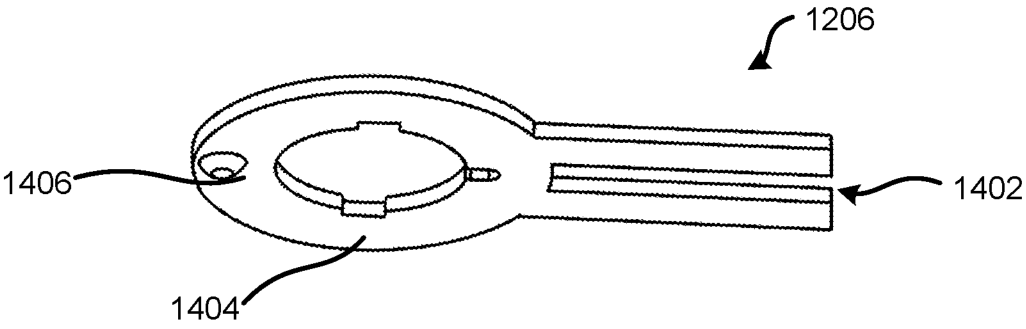
FIG. 14 is a diagram of a cantilever beam structure of the hybrid button device of FIG. 12 according to at least one embodiment of the present disclosure.

FIGS. 12-14 illustrate a hybrid button device 1200 according to at least one embodiment of the present disclosure. Hybrid button device 1200 includes a button 1202, a circuit board 1204, a cantilever 1206, a bracket 1208, a spring 1210, and a support frame 1212. Button 1202 includes an outer button 1220 and an inner button 1222. Circuit board 1204 includes contacts 1230 and 1232. Outer button 1220 includes a contact component 1240, and inner button 1222 includes a contact component 1240. As shown in FIG. 13, outer button 1220 includes one or more notches 1302, and inner button 1222 includes one or more snap fit components 1304. As shown in FIG. 14, cantilever 1206 includes a beam 1402, a disk 1404, and a contact portion 1406. In an example, beam 1402 may be a single beam or may be split into one or more separate beams. Disk 1404 may be any suitable shape including, but not limited to, a square, a circle, and an ellipse. In an example, beam 1402 may be made from a flexible material to enable the beam to flex and bend in response to a force exerted on disk 1404. In certain examples, hybrid button device 1200 may be utilized in information handling system 100 of FIG. 1.

When inner button 1222 is inserted within outer button 1220, snap fit components 1304 may snap fit within notches 1302. In an example, the snap fit components 1304 may be in physical communication with notches 1302 to prevent spring 1210 from pushing inner button 1222 beyond a top surface of outer button 1220. In certain examples, bracket 1208 may be positioned within frame 1212 to hold spring 1210 around contact 1232. In an example, spring 1232 may bias both outer button 1220 and inner button 1222 in a first position. In certain examples, cantilever 1206 may be in physical communication with contact component 1240 of button 1202 to provide support of outer button 1220 and inner button 1222.

In an example, hybrid button device 1200 may be utilized to cause an information handling system, such as information handling system 100 of FIG. 1, perform multiple functions or operations. For example, outer button 1220 may be used to cause the information handling system to perform a first operation, and inner button 1222 may be used to cause the information handling system to perform a second operation. In certain example, the first operation may be any suitable operation within information handling system including, but not limited to, a power on/off operation. Second operation may be any suitable operation including, but not limited to, clearing a CMOS, placing the information handling system in a deep sleep mode, providing a gaming application operation, and providing any other HCI operation.

In certain examples, in response to outer button 1220 being pressed downward, contact component 1240 may exert a force on cantilever 1206. The force on cantilever 1206 may cause the cantilever to bend toward circuit board 1204. In an example, a thickness of cantilever 1240 and contact component 1406 of the cantilever may increase contact component 1240, such that contact component 1406 may be placed in physical communication with contact 1230 before contact component 1242 is placed in physical communication with contact 1232. In response to contact component 1406 of cantilever 1206 exerting a force on contact 1230, the information handling system may perform the first operation. When the force pushing down on outer button 1220 is removed, spring 1210 exert a force on inner button 1222, which in turn may exert on force on outer button 1220 based on the physical communication between snap fit components 1304 and notches 1302.

In response to inner button 1222 being pressed downward, spring 1210 may compress and contact component 1242 may exert a force on contact 1232. In response to contact component 1242 exerting a force on contact 1232, the information handling system may perform the second operation. When the force pushing down on inner button 1222 is removed, spring 1210 exert a force on inner button 1222, which in turn may push inner button upwards until a top surface of inner button is substantially even with a top surface of outer button 1220.

Figure 15:
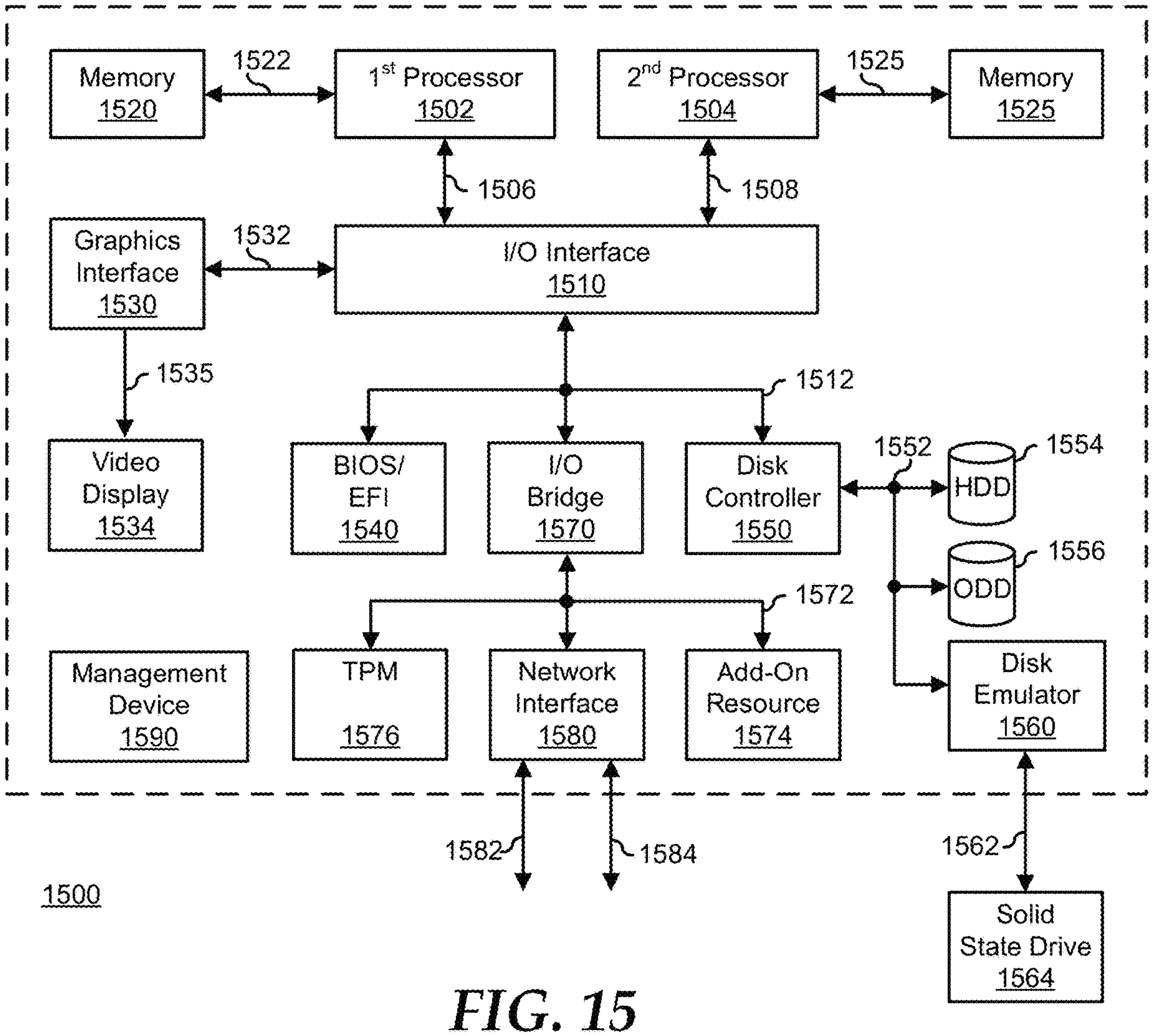
FIG. 15 is a block diagram of a general information handling system according to an embodiment of the present disclosure.

FIG. 15 illustrates a generalized embodiment of an information handling system 1500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1500 can include processing resources for executing machine-executable code, such as a central processing unit (CPU), a programmable logic array (PLA), an embedded device such as a System-on-a-Chip (SoC), or other control logic hardware. Information handling system 1500 can also include one or more computer-readable medium for storing machine-executable code, such as software or data. Additional components of information handling system 1500 can include one or more storage devices that can store machine-executable code, one or more communications ports for communicating with external devices, and various input and output (I/O) devices, such as a keyboard, a mouse, and a video display. Information handling system 1500 can also include one or more buses operable to transmit information between the various hardware components.

Information handling system 1500 can include devices or modules that embody one or more of the devices or modules described below, and operates to perform one or more of the methods described below. Information handling system 1500 includes a processors 1502 and 1504, an input/output (I/O) interface 1510, memories 1520 and 1525, a graphics interface 1530, a basic input and output system/universal extensible firmware interface (BIOS/UEFI) module 1540, a disk controller 1550, a hard disk drive (HDD) 1554, an optical disk drive (ODD) 1556, a disk emulator 1560 connected to an external solid state drive (SSD) 1562, an I/O bridge 1570, one or more add-on resources 1574, a trusted platform module (TPM) 1576, a network interface 1580, a management device 1590, and a power supply 1595. Processors 1502 and 1504, I/O interface 1510, memory 1520, graphics interface 1530, BIOS/UEFI module 1540, disk controller 1550, HDD 1554, ODD 1556, disk emulator 1560, SSD 1562, I/O bridge 1570, add-on resources 1574, TPM 1576, and network interface 1580 operate together to provide a host environment of information handling system 1500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1500.

In the host environment, processor 1502 is connected to I/O interface 1510 via processor interface 1506, and processor 1504 is connected to the I/O interface via processor interface 1508. Memory 1520 is connected to processor 1502 via a memory interface 1522. Memory 1525 is connected to processor 1504 via a memory interface 1527. Graphics interface 1530 is connected to I/O interface 1510 via a graphics interface 1532, and provides a video display output 1536 to a video display 1534. In a particular embodiment, information handling system 1500 includes separate memories that are dedicated to each of processors 1502 and 1504 via separate memory interfaces. An example of memories 1520 and 1530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1540, disk controller 1550, and I/O bridge 1570 are connected to I/O interface 1510 via an I/O channel 1512. An example of I/O channel 1512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1510 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 1540 includes BIOS/UEFI code operable to detect resources within information handling system 1500, to provide drivers for the resources, initialize the resources, and access the resources. BIOS/UEFI module 1540 includes code that operates to detect resources within information handling system 1500, to provide drivers for the resources, to initialize the resources, and to access the resources.

Disk controller 1550 includes a disk interface 1552 that connects the disk controller to HDD 1554, to ODD 1556, and to disk emulator 1560. An example of disk interface 1552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1560 permits SSD 1564 to be connected to information handling system 1500 via an external interface 1562. An example of external interface 1562 includes a USB interface, an IEEE 1394 (Firewire) interface, a proprietary interface, or a combination thereof. Alternatively, solid-state drive 1564 can be disposed within information handling system 1500.

I/O bridge 1570 includes a peripheral interface 1572 that connects the I/O bridge to add-on resource 1574, to TPM 1576, and to network interface 1580. Peripheral interface 1572 can be the same type of interface as I/O channel 1512, or can be a different type of interface. As such, I/O bridge 1570 extends the capacity of I/O channel 1512 when peripheral interface 1572 and the I/O channel are of the same type, and the I/O bridge translates information from a format suitable to the I/O channel to a format suitable to the peripheral channel 1572 when they are of a different type. Add-on resource 1574 can include a data storage system, an additional graphics interface, a network interface card (NIC), a sound/video processing card, another add-on resource, or a combination thereof. Add-on resource 1574 can be on a main circuit board, on separate circuit board or add-in card disposed within information handling system 1500, a device that is external to the information handling system, or a combination thereof.

Network interface 1580 represents a NIC disposed within information handling system 1500, on a main circuit board of the information handling system, integrated onto another component such as I/O interface 1510, in another suitable location, or a combination thereof. Network interface device 1580 includes network channels 1582 and 1584 that provide interfaces to devices that are external to information handling system 1500. In a particular embodiment, network channels 1582 and 1584 are of a different type than peripheral channel 1572 and network interface 1580 translates information from a format suitable to the peripheral channel to a format suitable to external devices. An example of network channels 1582 and 1584 includes InfiniBand channels, Fibre Channel channels, Gigabit Ethernet channels, proprietary channel architectures, or a combination thereof. Network channels 1582 and 1584 can be connected to external network resources (not illustrated). The network resource can include another information handling system, a data storage system, another network, a grid management system, another suitable resource, or a combination thereof.

Management device 1590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 1500. In particular, management device 1590 is connected to various components of the host environment via various internal communication interfaces, such as a Low Pin Count (LPC) interface, an Inter-Integrated-Circuit (I2C) interface, a PCIe interface, or the like, to provide an out-of-band (00B) mechanism to retrieve information related to the operation of the host environment, to provide BIOS/UEFI or system firmware updates, to manage non-processing components of information handling system 1500, such as system cooling fans and power supplies. Management device 1590 can include a network connection to an external management system, and the management device can communicate with the management system to report status information for information handling system 1500, to receive BIOS/UEFI or system firmware updates, or to perform other task for managing and controlling the operation of information handling system 1500. Management device 1590 can operate off of a separate power plane from the components of the host environment so that the management device receives power to manage information handling system 1500 when the information handling system is otherwise shut down. An example of management device 1590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multiple function button for an information handling system, the multiple function button comprising:

an outer shell including first, second, third and fourth channels; and an inner button inserted within the outer shell, the inner button including:

a tab configured to move within the channels, wherein when the tab is within the first channel the inner button is in a first position, and when the tab is within the third channel the inner button is in a second position;

a contact component wherein when the tab is within the first channel the contact component is positioned over a first contact of the information handling system, and when the tab is within the third channel the contact component is positioned over a second contact of the information handling system; and a spring to bias a top surface of the inner button even with a top surface of the outer shell.

2. The multiple function button of claim 1, further comprising:

a notch within an inner surface of the outer shell; and a retention component of the inner button, the retention component having a snap fit portion, wherein the snap fit portion of the retention component snap fits within the notch of the outer shell to secure the inner button within the outer shell.

3. The multiple function button of claim 1, further comprising a bump along a top edge of the second channel, wherein when the inner button is biased upwardly, the bump prevents the tab from leaving the first channel and entering the second channel.

4. The multiple function button of claim 3, wherein the tab is pushed below the bump and the inner button is rotated to cause the tab to enter the second channel.

5. The multiple function button of claim 1, wherein the tab slides down the first channel to enable the contact component to be placed in physical communication with the first contact of the information handling system.

6. The multiple function button of claim 1, wherein the tab slides down the third channel to enable the contact component to be placed in physical communication with the second contact of the information handling system.

7. The multiple function button of claim 1, wherein in response to a downward force being released from the inner button while the tab is in the third channel, the spring exerts a force on the inner button to cause the tab to slide from the third channel through the fourth channel and into the first channel.

8. An information handling system comprising:

a component including first and second contacts; and a hybrid button device in physical communication with the component, the hybrid button device including:

an outer shell having first, second, third and fourth channels; and an inner button inserted within the outer shell, the inner button including:

a tab configured to move within the channels, wherein when the tab is within the first channel the inner button is in a first position, and when the tab is within the third channel the inner button is in a second position;

a contact component wherein when the tab is within the first channel the contact component is positioned over the first contact of the component, and when the tab is within the third channel the contact component is positioned over the second contact of the component; and a bump along a top edge of the second channel, wherein when the inner button is biased upwardly, the bump prevents the tab from leaving the first channel and entering the second channel.

9. The information handling system of claim 8, wherein the hybrid button further includes:

a notch within an inner surface of the outer shell; and a retention component of the inner button, the retention component having a snap fit portion, wherein the snap fit portion of the retention component snap fits within the notch of the outer shell to secure the inner button within the outer shell.

10. The information handling system of claim 8, wherein the hybrid button further includes a spring to bias a top surface of the inner button even with a top surface of the outer shell.

11. The information handling system of claim 8, wherein the tab is pushed below the bump and the inner button is rotated to cause the tab to enter the second channel.

12. The information handling system of claim 8, wherein the tab slides down the first channel to enable the contact component to be placed in physical communication with the first contact of the information handling system.

13. The information handling system of claim 8, wherein the tab slides down the third channel to enable the contact component to be placed in physical communication with the second contact of the information handling system.

14. The information handling system of claim 8, wherein in response to a downward force being released from the inner button while the tab is in the third channel, a spring exerts a force on the inner button to cause the tab to slide from the third channel through the fourth channel and into the first channel.

15. A multiple function button for an information handling system, the multiple function button comprising:

an outer shell including:

an inner surface;

multiple channels within the inner surface, the multiple channels including first, second, third and fourth channels; and an inner button inserted within the outer shell, the inner button including:

a retention component of the inner button, the retention component having a snap fit portion, wherein the snap fit portion of the retention component snap fits within the notch of the outer shell to secure the inner button within the outer shell;

a tab configured to move within the multiple channels, wherein when the tab is within the first channel the inner button is in a first position, and when the tab is within the third channel the inner button is in a second position;

a contact component wherein when the tab is within the first channel the contact component is positioned over a first contact of the information handling system, and when the tab is within the third channel the contact component is positioned over a second contact of the information handling system; and a bump along a top edge of the second channel, wherein when the inner button is bias upward, the bump prevents the tab from leaving the first channel and entering the second channel.

16. The multiple function button of claim 15, further comprising a spring to bias a top surface of the inner button even with a top surface of the outer shell.

17. The multiple function button of claim 15, wherein the tab slides down the first channel to enable the contact component to be placed in physical communication with the first contact of the information handling system.

18. The multiple function button of claim 15, wherein the tab slides down the third channel to enable the contact component to be placed in physical communication with the second contact of the information handling system.

* * * * *